(12) United States Patent
Zhou et al.

(10) Patent No.: US 8,464,321 B2
(45) Date of Patent: Jun. 11, 2013

(54) METHOD FOR ASSIGNING NETWORK ADDRESSES, NETWORK AND NETWORK NODE THEREOF

(75) Inventors: Qian Zhou, Shenzhen (CN); Xiaoyu Gong, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 12/823,843

(22) Filed: Jun. 25, 2010

(65) Prior Publication Data

US 2010/0263028 A1    Oct. 14, 2010

Related U.S. Application Data

(63) Continuation of application No. PCT/CN2008/073813, filed on Dec. 29, 2008.

(30) Foreign Application Priority Data

Dec. 27, 2007  (CN) .......................... 2007 1 0305091

(51) Int. Cl.
    *G06F 7/04*    (2006.01)
(52) U.S. Cl.
    USPC .............................................. 726/4; 455/436
(58) Field of Classification Search
    None
    See application file for complete search history.

(56) References Cited

U.S. PATENT DOCUMENTS

| | | | |
|---|---|---|---|
| 2003/0193952 A1* | 10/2003 | O'Neill | 370/392 |
| 2004/0081109 A1* | 4/2004 | Oishi | 370/310 |
| 2004/0179539 A1 | 9/2004 | Takeda et al. | |
| 2006/0002356 A1 | 1/2006 | Barany et al. | |
| 2008/0026184 A1 | 1/2008 | Bacon | |

FOREIGN PATENT DOCUMENTS

| | | |
|---|---|---|
| CN | 1784059 | 6/2006 |
| CN | 1798158 A | 7/2006 |
| CN | 101010925 | 8/2007 |
| EP | 1 944 917 A1 | 7/2008 |
| KR | 10-2007-0033455 | 3/2007 |
| WO | 2007/043201 A1 | 4/2007 |
| WO | 2007/043744 | 4/2007 |

OTHER PUBLICATIONS

Written Opinion of the International Searching Authority, mailed Mar. 26, 2009 in International Application No. PCT/CN2008/073813 (5 pp.).

(Continued)

*Primary Examiner* — Hadi Armouche
*Assistant Examiner* — Jaron K Brunner
(74) *Attorney, Agent, or Firm* — Staas & Halsey LLP (57) ABSTRACT

A method for assigning network addresses is provided. When a mobile node (MN) moves to an access domain (AN) of a visited network, the method, in the visited network, includes: receiving a network access request sent by the MN; determining a home network of the MN according to user information of the MN, and sending an authentication request to the home network for authenticating the MN; receiving an authentication response returned by the home network, where the authentication response includes a local home of address (L-HoA) for identifying the AN where the MN is currently located; and assigning a local care of address (L-CoA) to the MN, where the L-CoA identifies position information of the MN in the current AN. Correspondingly, a network and a network node are provided. Thus, technical solutions can implement address assignment when the MN moves.

12 Claims, 7 Drawing Sheets

OTHER PUBLICATIONS

International Search Report, mailed Mar. 26, 2009, in corresponding International Application No. PCT/CN2008/073813 (4 pp.).

European Search Report dated Dec. 6, 2010 in corresponding European Patent Application 08866558.3.

Communication issued Aug. 28, 2012 in corresponding European Patent Application No. 08 866 558.3-2413 (5 pages).

Chinese Office Action issued Mar. 31, 2011 in corresponding Chinese Patent Application 200710305091.X.

"Telecommunications and Internet Converged Services and Protocols for Advanced Networking (TISPAN); NGN Functional Architecture: Network Attachment Sub-System(NASS); Final draft ETSI ES 282 004", ETSI Standards, LIS, Sophiaantipolis Cedex, France, vol. TISPAN, No. V2.0.0, Nov. 1, 2007, pp. 3-42.

Korean Office Action dated Jan. 30, 2012 issued in corresponding Korean Patent Application No. 10-2010-7015933.

Draft Recommendation Y.NACF, Functional requirements and architecture for NACF in Next Generation Network, International Telecommunication Union, Study Group 13, TD 330 (WP2/13), Geneva, Switzerland, Apr. 16-27, 2007, pp. 1-19.

* cited by examiner

METHOD FOR ASSIGNING NETWORK ADDRESSES, NETWORK AND NETWORK NODE THEREOF

CROSS-REFERENCE TO RELATED APPLICATIONS

This application is a continuation of International Application No. PCT/CN2008/073813, filed on Dec. 29, 2008, which claims priority to Chinese Patent Application No. 200710305091.X, filed on Dec. 27, 2007, both of which are hereby incorporated by reference in their entireties.

FIELD OF THE TECHNOLOGY

The present invention relates to the field of communication technology, and more particularly to a method for assigning network addresses, a network, and a network node thereof.

BACKGROUND OF THE INVENTION

The next generation network (NGN) is an open convergence network, which takes soft switch as the core, takes the optical network and the packet transport technology as the basis, provides voice, audio, data, as well as other multimedia integrated services, and adopts an open and standard system structure. A network attachment control function (NACF) is an important control functional entity of a transport layer in the NGN system architecture, and the main functions include network access authentication, configuration of Internet Protocol (IP) address and access parameters, binding update of mobile locations, and generating, pushing, and delivering of user policies for the customer premise equipment (CPE).

Figure 1:
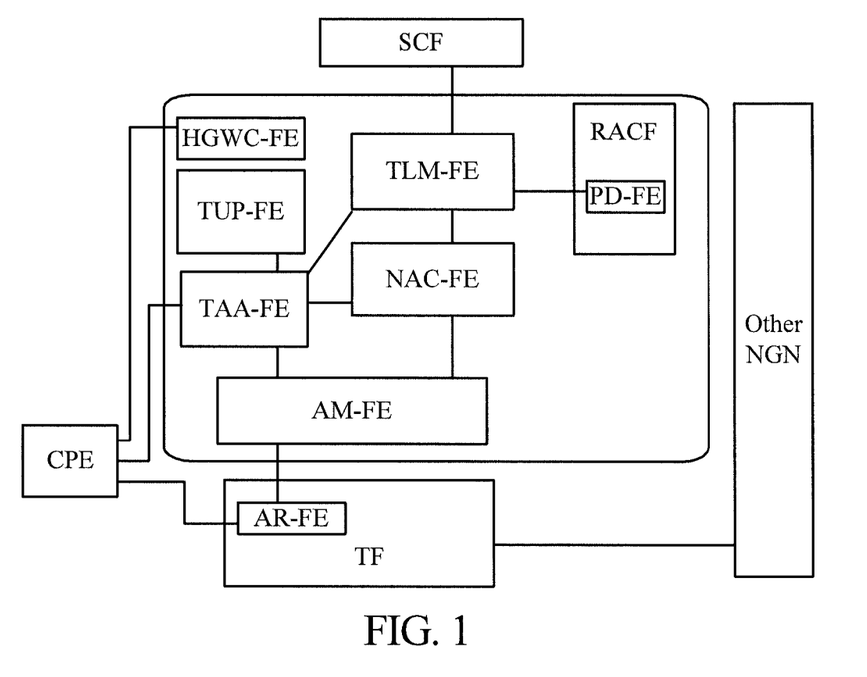
FIG. 1 is a schematic view of an NACF architecture proposed by the ITU-T in the prior art.

FIG. 1 is a schematic view of an NACF architecture proposed by International Telecommunication Union Telecommunication Standardization Sector (ITU-T) in the prior art.

As shown in FIG. 1, the NACF mainly includes an access manager functional entity (AM-FE), a transport authentication and authorization functional entity (TAA-FE), a transport user profile functional entity (TUP-FE), a network access configuration functional entity (NAC-FE), and a transport location management functional entity (TLM-FE).

The AM-FE is configured to implement a Dynamic Host Configuration Protocol (DHCP) L3 Relay function and an Authentication Authorization Accounting (AAA) Client function.

The TAA-FE is configured to implement an AAA Server function.

The TUP-FE is equivalent to a database for saving configuration files customized by users and other information. The content of the configuration file of the user includes a user name, a password, user initial gating information, and a quality of service (QoS) configuration for a user service.

The NAC-FE is configured to implement configuration of an IP address and access parameters of a CPE (usually referring to a user terminal). The NAC-FE assigns the IP address to the user terminal, and meanwhile possibly assigns other network configuration parameters to the user terminal, for example, an address of a domain name system (DNS) server, and an address of a signaling agent. The NAC-FE also provides an identity of an access network (AN), which uniquely identifies an AN to which the terminal is attached, and the upper layer application can locate the TLM-FE by using such information.

The TLM-FE is configured to implement an address binding update function of a mobile node (MN). The TLM-FE is a core functional entity of the NACF. The TAA-FE binds the current address information of the MN obtained from the NAC-FE with user related information, reports a query result about the current location to a Service Control Functions (SCF) layer, pushes the bound user terminal location and QoS configuration customized by the user to a Resource and Admission Control Functions (RACF) to serve as the basis for resource admission control.

The moving motion of the user terminal (may be called MN here) in the NGN network may be divided into three modes. The first mode is to move across core networks (CN) and across different operators. The second mode is to move in the same CN but across different ANs, which is also called an Inter-AN handover mode. One CN may correspond to a plurality of ANs, and different ANs correspond to different bearer layer management entities, that is, correspond to different NACF entities. The third mode is to move in the same AN, and is also called an Intra-AN handover mode.

During the researching and practicing of the prior art, the inventors find that the prior art has the following problems.

Regardless of the moving mode, when an MN moves within the NGN network, the network side needs to assign an address to the MN, but the NACF architecture in the NGN network in the prior art provides no method for assigning addresses when the MN moves.

SUMMARY OF THE INVENTION

Accordingly, the present invention is directed to a method for assigning network addresses, a network, and a network node thereof, which are capable of implementing an address assignment when an MN moves.

In order to solve the above technical problem, the embodiments of the present invention are implemented through the following technical solutions.

In an embodiment, the present invention provides a method for assigning network addresses, which includes the following steps.

When an MN moves to an AN of a visited network, the method includes the following steps in the visited network.

A network access request sent by the MN is received.

A home network of the MN is determined according to user information of the MN, and an authentication request is sent to the home network for authenticating the MN.

An authentication response returned by the home network is received, in which the authentication response includes a local home of address (L-HoA) for identifying the AN where the MN is currently located.

A local care of address (L-CoA) is assigned to the MN, in which the L-CoA identifies position information of the MN in the current AN.

In an embodiment, the present invention also provides a network, which includes a visited network-transport authentication and authorization functional entity (V-TAA-FE) and a visited network-access manager functional entity (V-AM-FE).

The V-AM-FE is configured to receive a network access request sent by an MN, and assign an L-CoA for identifying position information of the MN in a current AN after the MN successfully passes authentication.

The V-TAA-FE is configured to determine a home network of the MN according to user information of the MN, send an authentication request to the home network for authenticating the MN, and receive an authentication response returned by the home network, wherein the authentication response includes an L-HoA for identifying the AN where the MN is currently located.

In an embodiment, the present invention further provides a network node, which includes a receiving unit, an address assigning unit, and a sending unit.

The receiving unit is configured to receive a message including an authentication result of an MN.

The address assigning unit is configured to assign an L-CoA for identifying position information of the MN in a current AN, after the authentication result of the MN received by the receiving unit indicates that the MN successfully passes authentication.

The sending unit is configured to send the L-CoA assigned by the address assigning unit outwards.

In an embodiment, the present invention further provides a network, which includes a TAA-FE and an NAC-FE.

The TAA-FE is configured to receive an authentication request including user information of an MN from a network where the MN is attached, and perform authentication on the MN according to the authentication request.

The NAC-FE is configured to assign an L-HoA for identifying an AN where the MN is currently located to the MN according to the user information of the MN after the MN successfully passes the authentication, and send the L-HoA to the network to which the MN is attached through the TAA-FE.

As known from the technical solutions, an NACF architecture in an NGN network in the prior art provides no method for assigning addresses when a user terminal moves. According to the embodiments of the present invention, in an existing NGN network mobility architecture, definitions of a CoA and an HoA and assignment modes in a Mobile IP are extended. In the embodiments of the present invention, the two addresses are defined as the L-CoA and the L-HoA, and how to assign the addresses when the user terminal moves is provided, so as to solve the problem about address assigning in the NGN scenario when the user terminal moves.

DETAILED DESCRIPTION OF THE EMBODIMENTS

The present invention provides a method for assigning network addresses, which is configured to implement address assignment when an MN moves.

In the embodiments of the present invention, in an existing NGN network mobility architecture, definitions of a CoA and an HoA and assignment modes in a Mobile IP are extended. In the embodiments of the present invention, the two addresses are defined as an L-CoA and an L-HoA.

The L-CoA is a local On-Link address for identifying position information of an MN in a current AN. When the MN moves and hands over in one AN to change an attached location, the L-CoA is changed. The L-HoA is a local home of address of a mobile user, which may identify an AN where the MN is currently located. When the MN moves and hands over in one AN, the L-HoA is not changed; but when the MN hands over among the ANs, the L-HoA is changed.

For the L-HoA and the L-CoA, in the assignment method according to the embodiment of the present invention, a home network assigns an L-HoA to the moving MN, and a visited network assigns an L-CoA to the moving MN.

The method for assigning addresses according to the embodiment of the present invention is introduced in detail with reference to accompanying drawings.

Figure 2:
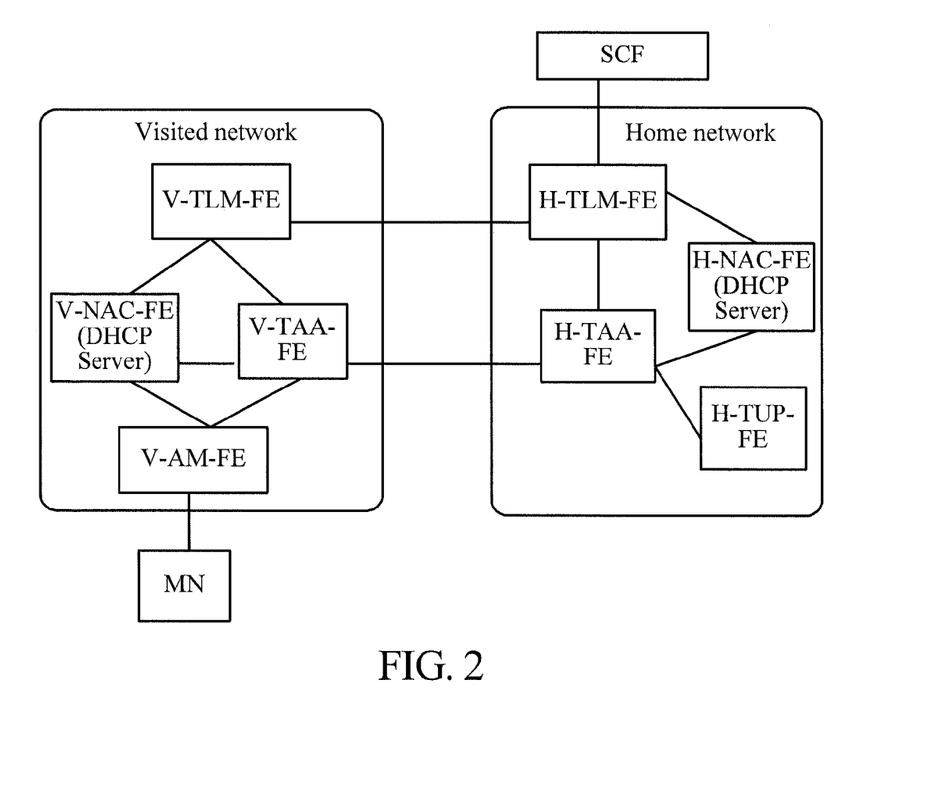
FIG. 2 is a schematic view of a network in a scenario according to an embodiment of the present invention.

Referring to FIG. 2, it is a schematic view of a network in a scenario according to an embodiment of the present invention.

As shown in FIG. 2, a home network and a visited network exist. An MN moves among different ANs of the visited network. In FIG. 2, when a letter V is added before an FE, it represents that the FE belongs to the visited network, and when a letter H is added before an FE, it represents that the FE belongs to the home network. The visited network involves a V-AM-FE, a V-TAA-FE, a V-NAC-FE, and a V-TLM-FE; and the home network involves an H-TAA-FE, an H-NAC-FE, an H-TLM-FE, and an H-TUP-FE.

As described above, when the MN moves in one AN, the L-HoA is not changed; when the MN moves across the ANs, the L-HoA is changed. Therefore, when the MN moves to a new AN, the MN requests an assignment of an L-HoA again. In the following, three embodiments of the present invention are introduced.

Figure 3:
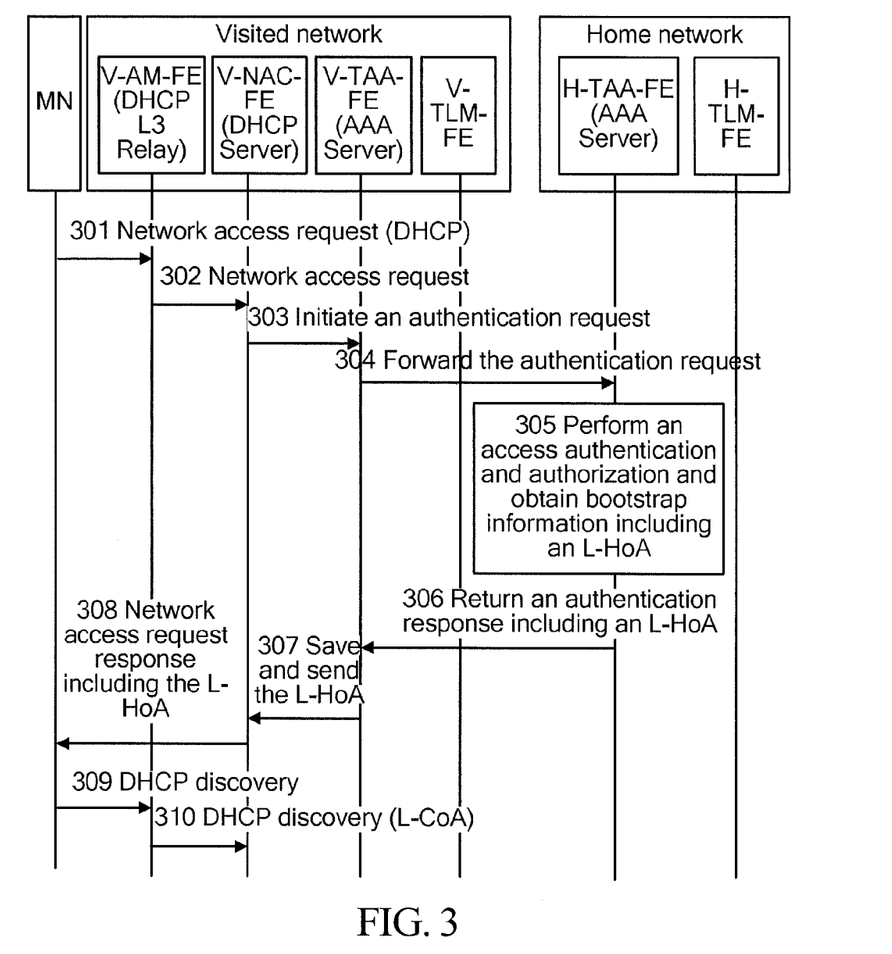
FIG. 3 is a flow chart of a method for assigning addresses according to a first embodiment of the present invention.

FIG. 3 is a flow chart of a method for assigning addresses according to a first embodiment of the present invention. In the first embodiment, mainly a V-NAC-FE serving as a DHCP Server performs address assignment after triggering an authentication. In FIG. 3, the method includes the following steps.

In Step 301, when moving to a new AN, an MN sends a network access request to a V-AM-FE serving as a DHCP L3 Relay in a visited network by using a DHCP protocol, where the network access request carries information required for user authentication of the MN, and particularly, the information required for the user authentication of the MN includes user information of the MN.

In Step 302, the V-AM-FE in the visited network performs a relay conversion on the network access request initiated by the MN, and forwards to a V-NAC-FE serving as a DHCP Server in the visited network.

In Step 303, the V-NAC-FE in the visited network initiates an authentication request to a V-TAA-FE serving as an AAA Server in the visited network by using an AAA protocol.

In Step 304, the V-TAA-FE in the visited network determines a home network of the MN according to the user information of the MN carried in the authentication request, and forwards the authentication request to an H-TAA-FE serving as an AAA Server in the home network for performing access authorization and authentication.

In Step 305, after receiving the authentication request, the H-TAA-FE in the home network performs the access authorization and authentication, and obtains bootstrap information of the MN from a network element (NE) device in the home network, for example, an H-NAC-FE serving as a DHCP Server, after the MN successfully passes the access authentication and authorization. The bootstrap information of the MN includes L-HoA information, and the L-HoA may be dynamically assigned by the H-NAC-FE in the home network.

The bootstrap here generally refers to a procedure that the MN obtains sufficient information to register with an appropriate home agent (HA). The bootstrap information includes an address of an HA, a home address of the MN, and a security association (SA) between the MN and the HA. The bootstrap information in the embodiment of the present invention includes the L-HoA dynamically assigned by the H-NAC-FE to the MN.

In Step 306, the H-TAA-FE in the home network returns an authentication response to the V-TAA-FE in the visited network, where the authentication response carries the bootstrap information including the L-HoA.

In Step 307, the V-TAA-FE in the visited network saves the L-HoA, and sends the L-HoA to the V-NAC-FE in the visited network.

In Step 308, the V-NAC-FE in the visited network obtains the L-HoA, and returns a network access request response to the MN, where the network access request response carries the L-HoA assigned to the MN.

The V-AM-FE in the visited network assigns an L-CoA to the MN, and Step 309 to Step 310 further include a procedure of distributing the L-CoA in the visited network, and the details are given in the following.

In Step 309, after successfully passing the authentication, the MN sends a discovery message, for example, DHCP discovery to the V-AM-FE serving as the DHCP L3 Relay in the visited network.

In Step 310, the V-AM-FE in the visited network forwards the DHCP discovery to the V-NAC-FE serving as the DHCP Server in the visited network, and inserts the L-CoA or an address prefix of the L-CoA in a DHCP option.

The L-CoA may be an address of an access router (AR) of the V-AM-FE (for example, under PMIPv4/v6 or MIPv4 FA scenario), or may be formed by combining a routing prefix of the AR of the V-AM-FE with an interface address of the AR of the V-AM-FE. In the physical implementation, the V-AM-FE and the AR may be collocated in one physical device.

It should be noted that, no specific sequence relation exists between the distribution of the L-CoA in Steps 309 to 310 and the distribution of the L-HoA in the previous steps, and it is only for the sake of convenience of description.

Figure 4:
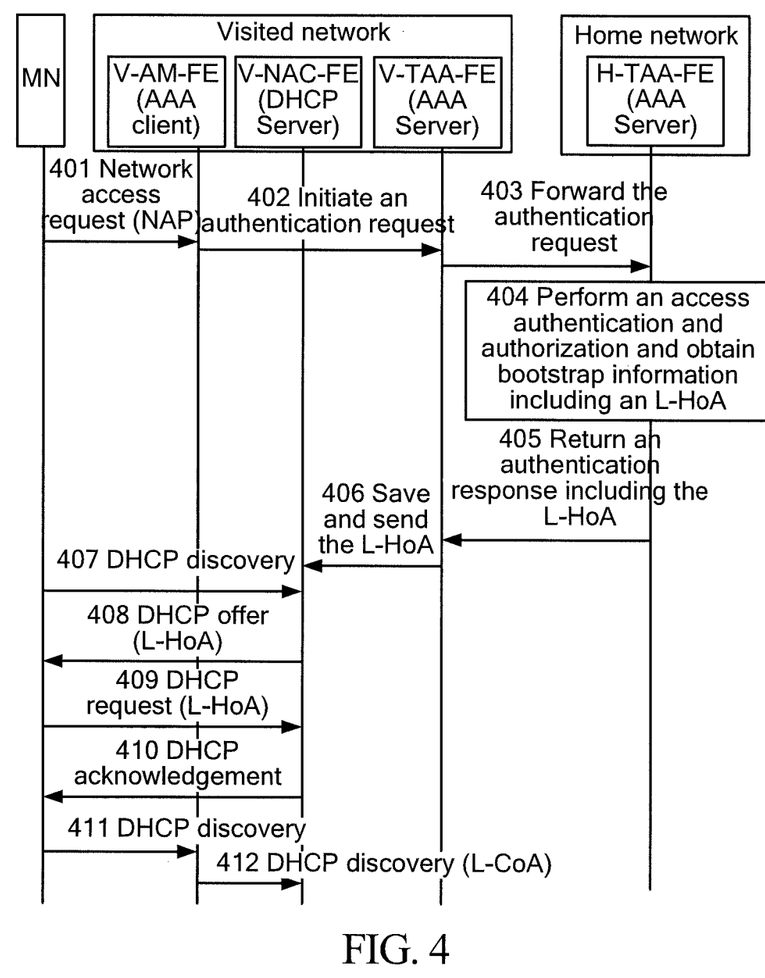
FIG. 4 is a flow chart of a method for assigning addresses according to a second embodiment of the present invention.

FIG. 4 is a flow chart of a method for assigning addresses according to a second embodiment of the present invention. The second embodiment is directed to a method for address assignment which is performed after a V-AM-FE triggers an authentication. In FIG. 4, the method includes the following steps.

In Step 401, when an MN moves to a new AN, the MN sends a network access request to a V-AM-FE serving as an AAA Client in a visited network by using a network access protocol (NAP) (for example, a Protocol for Carrying Authentication and Network Access, PANA, or an IEEE 802.1X protocol), where the network access request carries information required for user authentication of the MN, which particularly includes user information of the MN.

In Step 402, the V-AM-FE in the visited network shields the particular network access request, and sends an authentication request to a V-TAA-FE serving as an AAA Server in the visited network by using an AAA protocol, so as to implement an attaching authentication procedure.

In Step 403, the V-TAA-FE in the visited network determines a home network of the MN according to the user information of the MN carried in the authentication request, and forwards the authentication request to an H-TAA-FE serving as an AAA Server in the home network for performing access authorization and authentication.

In Step 404, the H-TAA-FE in the home network obtains bootstrap information of the MN from an NE device in the home network, for example, an H-NAC-FE serving as a DHCP Server, after the MN successfully passes the access authentication and authorization. The bootstrap information of the MN includes L-HoA information, and the L-HoA may be dynamically assigned by the H-NAC-FE in the home network.

In Step 405, the H-TAA-FE in the home network returns an authentication response to the V-TAA-FE in the visited network, where the authentication response carries the bootstrap information including the L-HoA.

In Step 406, the V-TAA-FE in the visited network saves the L-HoA, and sends the L-HoA to a V-NAC-FE in the visited network (the V-NAC-FE serves as a DHCP Server in the visited network).

In Step 407, the MN sends a discovery message, i.e. DHCP Discovery, to the V-NAC-FE in the visited network via a DHCP L3 Relay in the visited network, so as to request the assignment of the L-HoA.

In Step 408, the V-NAC-FE in the visited network sends an offer message, i.e. DHCP offer, to the MN, where the DHCP offer includes the L-HoA and an IP address of the V-NAC-FE itself.

In Step 409, the MN sends a DHCP request to the V-NAC-FE in the visited network according to the received DHCP offer, where the DHCP request carries the L-HoA.

In Step 410, the V-NAC-FE in the visited network returns a DHCP acknowledgement message to the MN.

The V-AM-FE in the visited network assigns an L-CoA to the MN, and Step 411 to Step 412 further include a procedure of distributing the L-CoA in the visited network, and the details are given in the following.

In Step 411, after successfully passing the authentication, the MN sends a DHCP discovery to the V-AM-FE serving as the DHCP L3 Relay in the visited network.

As known from the above description, the V-AM-FE may implement a DHCP L3Relay function and an AAA Client function, and in the above step, the DHCP L3 Relay function of the V-AM-FE is utilized.

In Step 412, the V-AM-FE in the visited network forwards the DHCP discovery to the V-NAC-FE serving as the DHCP Server in the visited network, and inserts the L-CoA or an address prefix of the L-CoA into a DHCP option.

The L-CoA may be an address of an AR of the V-AM-FE (for example, under PMIPv4/v6 or MIPv4 FA scenario), or may be formed by combining a routing prefix of the AR of the V-AM-FE with an interface address of the AR of the V-AM-FE. In the physical implementation, the V-AM-FE and the AR may be located in one physical device.

It should be noted that, no specific sequence relation exists between the distribution of the L-CoA in Steps 411 to 412 and the distribution of the L-HoA in the previous steps, and it is only for the sake of convenience of description.

Figure 5:
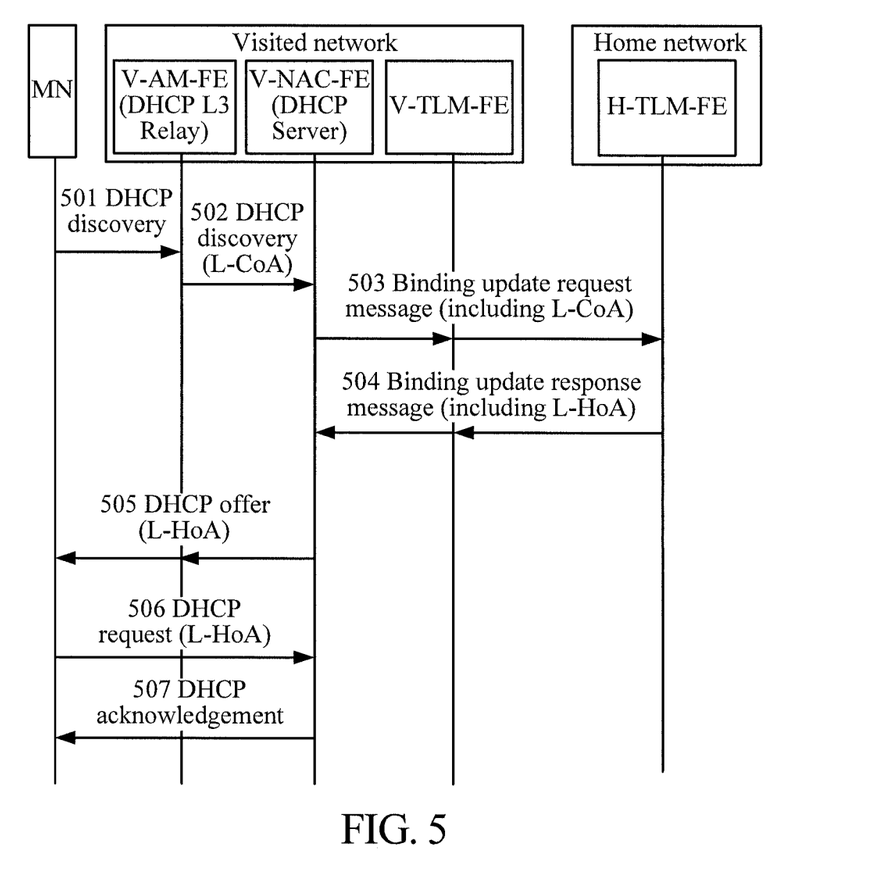
FIG. 5 is a flow chart of a method for assigning addresses according to a third embodiment of the present invention.

FIG. 5 is a flow chart of a method for assigning addresses according to a third embodiment of the present invention. In this embodiment, an MIP binding is performed based on an MIP protocol. Mainly, a visited network assigns an L-CoA, a V-NAC-FE serving as a DHCP Server in the visited network sends a proxy binding update request message to an H-TLM-FE in a home network, and the H-TLM-FE assigns an L-HoA to an MN. Under the NGN scenario, a function of a TLM-FE entity in an NACF is equivalent to a control function of an HA in the MIP protocol.

In FIG. 5, the method includes the following steps.

In Step 501, when an MN moves to a new AN, the MN initiates an authentication to a network side by using an NAP or a DHCP protocol, and after successfully passing the authentication, the MN sends a discovery message, i.e. DHCP discovery, to a V-AM-FE serving as a DHCP L3 Relay in a visited network.

The authentication procedure here may be obtained with reference to the processes in the first embodiment and the second embodiment.

In Step 502, the V-AM-FE in the visited network forwards the DHCP discovery to a V-NAC-FE serving as a DHCP Server in the visited network, and inserts an L-CoA or an address prefix of the L-CoA into a DHCP option.

The L-CoA may be an address of an AR of the V-AM-FE (for example, under PMIPv4/v6 or MIPv4 FA scenario), or may be formed by combining a routing prefix of the AR of the V-AM-FE with an interface address of the AR of the V-AM-FE. In the physical implementation, the V-AM-FE and the AR may be located in one physical device, In Step 503, the V-NAC-FE in the visited network sends a proxy binding update request message to an H-TLM-FE in a home network via a V-TLM-FE in the visited network according to the obtained L-CoA and identity of the MN, where the proxy binding update request message includes the L-CoA and the identity of the MN.

In Step 504, the H-TLM-FE in the home network obtains an L-HoA from an NE device in the home network, for example, an H-NAC-FE serving as a DHCP Server, according to the identity of the MN and other information, at least binds the identity of the MN and the L-HoA, and sends a proxy binding update response message to the V-NAC-FE in the visited network via the V-TLM-FE in the visited network, where the proxy binding update response message includes binding information. In addition, after receiving the proxy binding update response message, the V-TLM-FE in the visited network obtains the carried L-HoA, and binds the identity of the MN, the L-HoA, and the L-CoA.

In Step 505, upon receiving the proxy binding update response message, the V-NAC-FE in the visited network sends a DHCP offer to the MN via the V-AM-FE in the visited network, where the DHCP offer includes the L-HoA and an IP address of the V-NAC-FE itself. The V-AM-FE in the visited network obtains the L-HoA included in the DHCP offer sent by the V-NAC-FE.

In Step 506, the MN sends a DHCP request carrying the L-HoA to the V-NAC-FE in the visited network according to the obtained L-HoA information.

In Step 507, the V-NAC-FE in the visited network returns a DHCP acknowledgement message to the MN.

It should be noted that, this embodiment is implemented under the Proxy MIPv4/v6 scenario, without sending the L-CoA to the MN.

If this embodiment is implemented under the scenario of MIPv6 and MIPv4, the V-AM-FE may send the L-CoA to the MN through a route advertisement (RA) message.

It should be noted that, in the embodiment of the present invention, the address assignment under a roaming condition is taken as an example, but the present invention is not limited hereto. The present invention may also be applied to address assignment under a non-roaming condition, and the home network and the visited network respectively correspond to an AN and a CN, and the corresponding principle is the same.

It may be found that, through the method for assigning addresses according to the present invention, the problem about the address assignment when the MN moves under the NGN scenario is well solved.

In the above description, the method for assigning addresses according to the embodiment of the present invention has been introduced in detail, and correspondingly, in an embodiment, the present invention further provides a network system.

Figure 6:
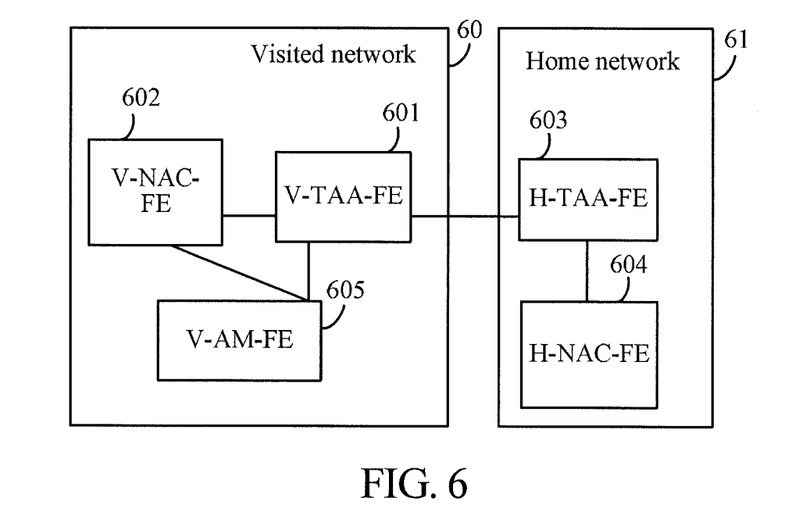
FIG. 6 is a schematic structural view of a first network system according to an embodiment of the present invention.

FIG. 6 is a schematic structural view of a first network system according to an embodiment of the present invention.

As shown in FIG. 6, the network system includes a visited network 60 and a home network 61.

The visited network 60 is configured to receive a network access request sent by an MN, determine the home network 61 of the MN according to user information of the MN, send an authentication request to the determined home network 61 for authenticating the MN, receive an authentication response including an L-HoA of the MN returned by the home network 61 after the MN successfully passes the authentication, send the L-HoA to the MN, and assign an L-CoA to the MN after the MN successfully passes the authentication, where the L-HoA is assigned to the MN by the home network 61.

The home network 61 is configured to receive the authentication request from the visited network 60, perform authentication on the MN, assign the L-HoA to the MN according to the user information of the MN after the MN successfully passes the authentication, and send the L-HoA to the visited network 60.

The visited network 60 includes a H-TAA-FE 601 in the visited network 60, and a V-NAC-FE 602 in the visited network 60. The home network 61 includes an H-TAA-FE 603 in the home network 61.

The V-TAA-FE 601 in the visited network 60 is configured to determine the home network 61 of the MN according to the user information of the MN when the MN moves to a different AN in the visited network, forward the authentication request of the MN to the H-TAA-FE 603 in the home network 61 of the MN, receive the authentication response carrying the L-HoA returned by the H-TAA-FE 603 after the MN successfully passes the authentication, and send the L-HoA to the MN via the V-NAC-FE 602 in the visited network 60, where the user information of the MN is carried in the authentication request.

The V-NAC-FE 602 in the visited network 60 is configured to forward the L-HoA sent by the V-TAA-FE 601 to the MN.

The H-TAA-FE 603 in the home network 61 is configured to receive the authentication request forwarded by the V-TAA-FE 601, perform authentication on the MN, obtain the L-HoA that is assigned by an H-NAC-FE 604 in the home network to the MN after the MN successfully passes the authentication, and return the authentication response carrying the L-HoA to the V-TAA-FE 601.

The home network 61 further includes: an H-NAC-FE 604 in the home network 61, configured to assign the L-HoA to the MN by adopting a DHCP mode according to the user information of the MN after the MN successfully passes the authentication. The H-TAA-FE 603 obtains the L-HoA assigned to the MN by the H-NAC-FE 604 from the H-NAC-FE 604.

The visited network 60 further includes a V-AM-FE 605 in the visited network 60.

The V-AM-FE 605 is configured to receive the network access request sent by the MN by using an NAP, and trigger the authentication request to the V-TAA-FE 601 by using an AAA protocol according to the network access request; or is configured to receive the network access request sent by the MN by using a DHCP, and send the network access request to the V-NAC-FE 602. Then, the V-NAC-FE 602 initiates the authentication request to the V-TAA-FE 601 by using the AAA protocol according to the received network access request.

The V-AM-FE 605 is further configured to assign the L-CoA to the MN after the MN successfully passes the authentication of the home network 61.

Figure 7:
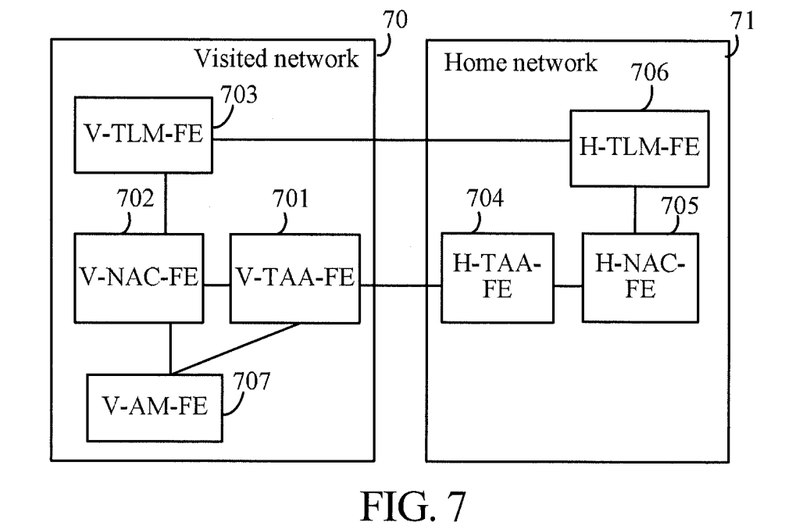
FIG. 7 is a schematic structural view of a second network system according to an embodiment of the present invention.

FIG. 7 is a schematic structural view of a second network system according to an embodiment of the present invention.

As shown in FIG. 7, the network system includes a visited network 70 and a home network 71.

The visited network 70 is configured to forward an authentication request of an MN to the home network 71 of the MN when the MN moves to a different AN in the visited network, assign an L-CoA to the MN after the MN successfully passes an authentication of the home network 71, send a proxy binding update request message carrying an identity of the MN to the home network 71, receive an L-HoA assigned to the MN from the home network 71, and send the L-HoA to the MN.

The home network 71 is configured to receive the authentication request forwarded by the visited network 70, perform authentication on the MN, assign the L-HoA to the MN according to the user information of the MN after receiving the proxy binding update request message carrying the identity of the MN and the L-HoA sent by the visited network 70 and after the MN successfully passes the authentication, at least bind the L-HoA and the identity of the MN, and send the L-HoA to the visited network 70.

The visited network 70 includes a V-TAA-FE 701 in the visited network 70, a V-NAC-FE 702 in the visited network 70, and a V-TLM-FE 703 in the visited network 70. The home network 71 includes an H-TAA-FE 704 in the home network 71, an H-NAC-FE 705 in the home network 71, and an H-TLM-FE 706 in the home network 71.

The V-TAA-FE 701 in the visited network 70 is configured to forward the authentication request of the MN to the H-TAA-FE 704 in the home network 71 of the MN when the MN moves to a different AN in the visited network.

The V-NAC-FE 702 in the visited network 70 is configured to send the proxy binding update request message carrying the identity of the MN and the L-CoA to the H-TLM-FE 706 in the home network 71 via the H-TLM-FE 703 in the visited network 70 when the MN successfully passes the authentication after the MN moves to the different AN, receive a proxy binding update response message carrying binding information returned by the H-TLM-FE 706 via the V-TLM-FE 703, and send the L-HoA to the MN, where the binding information represents a binding relation between the identity of the MN and the L-HoA.

The V-TLM-FE 703 in the visited network 70 is configured to forward the proxy binding update request message carrying the identity of the MN sent by the V-NAC-FE 702 to the H-TLM-FE 706 in the home network 71, and forward the proxy binding update response message for binding the L-HoA and the identity of the MN sent by the H-TLM-FE 706 to the V-NAC-FE 702.

The H-TAA-FE 704 in the home network 71 is configured to receive the authentication request forwarded by the V-TAA-FE 701, and perform authentication on the MN.

The H-NAC-FE 705 in the home network 71 is configured to assign the L-HoA to the MN by adopting a DHCP mode according the user information of the MN after the MN successfully passes the authentication. The H-TLM-FE 706 obtains the L-HoA assigned to the MN by the H-NAC-FE 705 from the H-NAC-FE 705.

The H-TLM-FE 706 in the home network 71 is configured to receive the proxy binding update request message sent by the V-NAC-FE 702, then obtain the L-HoA assigned to the MN, and return the proxy binding update response message at least carrying the L-HoA to the V-NAC-FE 702.

The H-TLM-FE 706 obtains the L-HoA assigned to the MN, then binds the L-HoA and the identity of the MN, and returns the proxy binding update response message carrying the binding information to the V-NAC-FE 702 via the V-TLM-FE 703, where the binding information represents the binding relation between the L-HoA and the identity of the MN. Correspondingly, the V-TLM-FE 703 forwards the received binding update response message sent by the H-TLM-FE 706 to the V-NAC-FE 702, obtains the L-HoA, and then binds the L-HoA, the identity of the MN, and the L-CoA.

The visited network further includes a V-AM-FE 707 in the visited network 70.

The V-AM-FE 707 is configured to receive the network access request sent by the MN, and send the network access request to the V-TAA-FE 701 to trigger the authentication request; or is configured to receive the network access request sent by the MN, and send the network access request to the V-NAC-FE 702. Then, the V-NAC-FE 702 sends the network access request to the V-TAA-FE 701 to trigger the authentication request.

The V-AM-FE 707 is further configured to assign the L-CoA to the MN after the MN successfully passes the authentication of the home network 71. The V-NAC-FE 702 obtains the L-CoA assigned to the MN from the V-AM-FE 707, and sends the proxy binding update request message carrying the L-CoA to the H-TLM-FE 706 via the V-TLM-FE 703.

In an embodiment, the present invention further provides a network node.

Figure 8:
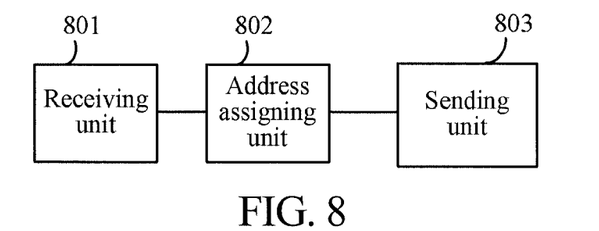
FIG. 8 is a schematic structural view of a first network node according to an embodiment of the present invention.

FIG. 8 is a schematic structural view of a first network node according to an embodiment of the present invention.

Referring to FIG. 8, the network node includes a receiving unit 801, an address assigning unit 802, and a sending unit 803.

The receiving unit 801 is configured to receive a message including an authentication result of an MN.

The address assigning unit 802 is configured to assign an L-CoA for identifying position information of the MN in a current AN to the MN, after the authentication result of the MN received by the receiving unit 801 indicates that the MN successfully passes the authentication.

The sending unit 803 is configured to send the L-CoA assigned by the address assigning unit 802 outwards, for example, the sending unit 803 sends the L-CoA to a V-NAC-FE, and for details, please refer to Steps 309 to 310 or Steps 411 to 412.

The network node according to the embodiment of the present invention may be a V-AM-FE, but the present invention is not limited hereto.

If the network node is a V-AM-FE, the network node further includes an access request receiving unit (not shown in FIG. 8).

The access request receiving unit is configured to receive the network access request from the MN, where the network access request may use a DHCP protocol or an NAP (for example, PANA or IEEE 802.1X protocol).

If the network node supports the NAP, the network node includes: an AAA Client, configured to send an authentication request including user information of the MN to a V-TAA-FE by using an AAA protocol according to the network access request using the NAP received by the network node from the MN.

If the network node supports the DHCP protocol, the network node includes: a DHCP Relay function, configured to relay the network access request using the DHCP received by the network node from the MN, and send the network access request to the V-NAC-FE.

Figure 9:
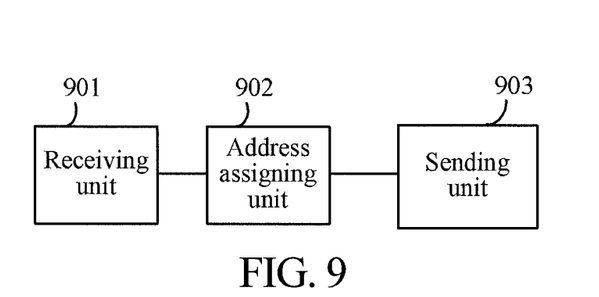
FIG. 9 is a schematic structural view of a second network node according to an embodiment of the present invention.

FIG. 9 is a schematic structural view of a second network node according to an embodiment of the present invention.

As shown in FIG. 9, the network node includes a receiving unit 901, an address assigning unit 902, and a sending unit 903.

The receiving unit 901 is configured to receive a message including an authentication result of an MN.

The address assigning unit 902 is configured to assign an L-HoA to the MN according to user information of the MN, after the authentication result of the MN received by the receiving unit 901 indicates that the MN successfully passes the authentication. The address assigning unit 902 assigns the L-HoA to the MN by adopting a DHCP mode.

The sending unit 903 is configured to send the L-HoA assigned by the address assigning unit 902 outwards.

The network node according to the embodiment of the present invention may be an H-NAC-FE, but the present invention is not limited hereto.

To sum up, the NACF architecture in the NGN network in the prior art provides no method for assigning addresses when the MN moves. In contrast, according to the embodiments of the present invention, in an existing NGN network mobility architecture, definitions of a CoA and an HoA and assignment modes in a Mobile IP are extended. In the embodiments of the present invention, the two addresses are defined as the L-CoA and the L-HoA, and how to assign the addresses when the user terminal moves is provided, so as to solve the problem about address assignment in the NGN scenario when the user terminal moves.

Furthermore, in the technical solutions of the embodiments of the present invention, the V-NAC-FE serving as the DHCP Server performs address assignment after triggering the authentication; or the V-AM-FE serving as the AAA client performs the address assignment after triggering the authentication; or the MIP binding is performed based on the MIP protocol, and the V-NAC-FE serving as the DHCP server in the visited network sends the proxy binding update request message to perform the address assignment.

The method for assigning network addresses, the network, and the network node of the present invention are described in detail above. Persons of ordinary skill in the art can make variations and modifications to the present invention in terms of the specific implementations and application scopes according to the ideas of the present invention. Therefore, the specification shall not be construed as limitations to the present invention.

What is claimed is:

1. A method for assigning network addresses, when a mobile node (MN) moves to an access network (AN) of a visited network, the method, in the visited network, comprising:

receiving a network access request sent by the MN;

determining a home network of the MN according to user information of the MN, and sending an authentication request to the home network for authenticating the MN;

receiving an authentication response returned by the home network, wherein the authentication response comprises a local home of address (L-HoA) for identifying the AN where the MN is currently located, when the MN moves and hands over in one AN the L-HoA is not changed, when the MN bands over among ANs, the L-HoA is changed;

assigning a local care of address (L-CoA) to the MN, wherein the L-CoA identifies position information of the MN in the current AN, when the MN moves and hands over in one AN, the L-CoA is changed;

sending a proxy binding update request message to the home network, when the MN successfully passes the authentication, wherein the proxy binding update request message comprises the L-CoA and an identity of the MN; and receiving a proxy binding update response message returned by the home network to obtain the L-HoA in the proxy binding update response message return by the home network, and bind the identity of the MN, the L-HoA, and the L-CoA.

2. The method for assigning network addresses according to claim 1, further comprising:

receiving, by a visited network-network access configuration functional entity (V-NAC-FE), the proxy binding update response message, and sending a Dynamic Host Configuration Protocol (DHCP) response message, DHCP offer, to the MN through a visited network-access manager functional entity (V-AM-FE), wherein the DHCP offer comprises the L-HoA and an Internet Protocol (IP) address of the V-NAC-FE itself; and receiving, by the V-NAC-FE, a DHCP request comprising the L-HoA from the MN, and returning a DHCP acknowledgement message to the MN according to the DHCP request.

3. The method for assigning network addresses according to claim 1, wherein a V-AM-FE receives the network access request sent by the MN; a visited network-transport authentication and authorization functional entity (V-TAA-FE) determines the home network of the MN according to the user information of the MN in the received authentication request, and forwards the authentication request to a home network-TAA-FE (H-TAA-FE) for authenticating the MN, wherein the authentication request is from a V-NAC-FE or the V-TAA-FE.

4. The method for assigning network addresses according to claim 3, wherein the network access request is a network access request using a DHCP, and between the receiving the network access request sent by the MN and the determining the home network of the MN according to the user information of the MN, the method further comprises:

receiving, by the V-AM-FE, the network access request sent by the MN by using the DHCP, relaying the network access request, and sending the network access request to the V-NAC-FE; and sending, by the V-NAC-FE, the authentication request to the V-TAA-FE by using an authentication authorization accounting (AAA) protocol according to the received network access request.

5. The method for assigning network addresses according to claim 3, wherein the network access request is a network access request using a Network Access Protocol (NAP), and between the receiving the network access request sent by the MN and the determining the home network of the MN according to the user information of the MN, the method further comprises:

receiving, by the V-AM-FE, the network access request sent by the MN by using the NAP, and sending the authentication request carrying the user information of the MN to the V-TAA-FE by using an AAA protocol.

6. The method for assigning network addresses according to claim 2, wherein the V-AM-FE assigns the L-CoA to the MN, and the L-CoA is an address of an access router (AR) of the V-AM-FE or is formed by combining a routing prefix of the AR of the V-AM-FE with an interface address of the AR of the V-AM-FE.

7. The method for assigning network addresses according to claim 6, further comprising: distributing the L-CoA of the MN, wherein the distributing the L-CoA of the MN further comprises:
receiving, by the V-AM-FE, a discovery message from the MN;
inserting, by the V-AM-FE, the L-CoA or an address prefix of the L-CoA in the discovery message; and
sending, by the V-AM-FE, the discovery message inserted with the L-CoA or the address prefix of the L-CoA to the V-NAC-FE.

8. A network, comprising:
a transport authentication and authorization functional entity (V-TAA-FE) and an access manager functional entity (V-AM-FE), wherein
the V-AM-FE is configured to receive a network access request sent by a mobile node (MN), and assign a local care of address (L-CoA) for identifying position information of the MN in a current access domain (AN) to the MN, when the MN moves and hands over in one AN, the L-CoA is changed, and
the V-TAA-FE is configured to determine a home network of the MN according to user information of the MN, send an authentication request to the home network for authenticating the MN, and receive an authentication response returned by the home network, wherein the authentication response comprises a local home of address (L-HoA) for identifying the AN where the MN is currently located when the MN moves and hands over in one AN, the L-HoA is not changed, when the MN hands over among ANs, the L-HoA is changed; and
a network access configuration functional entity (V-NAC-FE) and a transport location management functional entity (V-TLM-FE), wherein
the V-TAA-FE sends the L-HoA to the V-NAC-FE, and the V-NAC-FE sends the L-HoA to the MN, and
the V-NAC-FE is configured to send, when the MN successfully passes authentication, a proxy binding update request message carrying the L-CoA and an identity of the MN to the home network of the MN through the V-TLM-FE, receive a proxy binding update response message carrying the L-HoA, and hind the L-HoA, the L-CoA and the identity of the MN returned by the home network.

9. The network according to claim 8, wherein
the V-AM-FE is configured to receive the network access request sent by the MN by using a Network Access Protocol (NAP), and send the authentication request comprising the user information of the MN to the V-TAA-FE by using an authentication authorization accounting (AAA) protocol according to the network access request.

10. The network according to claim 8, wherein
the V-AM-FE is configured to receive the network access request sent by the MN by using a dynamic host configuration protocol (DHCP), relay the network access request, and send the network access request to the V-NAC-FE, and
the V-NAC-FE is configured to send the authentication request comprising the user information of the MN to the V-TAA-FE by using an AAA protocol according to the received network access request.

11. A network node in a network visited by a mobile node (MN), comprising:
a processing device configured to:
receive a message from a home network of the MN comprising an authentication result of the MN, wherein the authentication result comprises a local home of address (L-HoA) for identifying the AN where the MN is currently located, when the MN moves and hands over in one AN, the L-HoA is not changed, when the MN hands over among ANs, the L-HoA is changed;
assign a local care of address (L-CoA) to the MN for identifying position information of the MN in a current access domain (AN) for the network node in the visited network, when the MN moves and hands over in one AN, the L-CoA is changed;
send a proxy binding update request message to the home network, when the MN successfully passes the authentication, wherein the proxy binding update request message comprises the L-CoA and an identity of the MN, and
receive a proxy binding update response message returned by the home network to obtain the L-HoA in the proxy binding update response message returned by the home network, and bind the identity of the MN, the L-HoA, and the L-CoA.

12. The network node according to claim 11, wherein the network node comprises a Dynamic Host Configuration Protocol (DHCP) relay function, or an authentication authorization accounting protocol client (AAA client),
wherein the DHCP relay function is configured to relay a network access request using a DHCP received by the network node from the MN, and send the network access request to a network access configuration functional entity (V-NAC-FE); and
the AAA client is configured to send an authentication request comprising user information of the MN to a visited network-transport authentication and authorization functional entity (V-TAA-FE) by using an AAA protocol according to a network access request using a Network Access Protocol (NAP) received by the network node from the MN.

* * * * *

UNITED STATES PATENT AND TRADEMARK OFFICE
CERTIFICATE OF CORRECTION

PATENT NO. : 8,464,321 B2
APPLICATION NO. : 12/823843
DATED : June 11, 2013
INVENTOR(S) : Zhou et al.

Page 1 of 2

It is certified that error appears in the above-identified patent and that said Letters Patent is hereby corrected as shown below:

In the Claims

Claim 1, Column 11, Line 1-2:

After "Mn" insert --by the current AN--

Claim 1, Column 11, Line 64-67:

Delete "located, when the MN moves and hands over in one AN the L-HoA is not changed, when the MN bands over among ANs, the L-HoA is changed;" and insert --located;--, therefor Claim 8, Column 13, Line 23:

Delete "when the MN moves and hands over in one AN," and insert --when the MN moves and performs an inter-AN hand over in one AN,--, therefor Claim 8, Column 13, Line 32-34:

Delete "located when the MN moves and hands over in one AN, the L-HoA is not changed, when the MN hands over among ANs, the L-HoA is changed;" and insert --located;--, therefor Claim 14, Column 14, Line 17-18:

Delete "the AN" and insert --an access network (AN)--, therefor

Claim 11, Column 14, Line 18-21:

Delete "located, when the MN moves and hands over in one AN, the L-HoA is not changed, when the MN hands over among ANs, the L-HoA is changed;" and insert --located;--, therefor Signed and Sealed this
Twenty-third Day of June, 2015

Michelle K. Lee
*Director of the United States Patent and Trademark Office*

Claim 11, Column 14, Line 25:

Delete "when the MN moves and hands over in one AN," and insert --when the MN moves and performs an inter-AN hand over in one AN--, therefor